Oct. 4, 1927.

H. P. DONLE 1,644,242

CONDENSER

Filed Sept. 22, 1923

INVENTOR
Harold P. Donle
BY
ATTORNEY

Patented Oct. 4, 1927.

1,644,242

UNITED STATES PATENT OFFICE.

HAROLD POTTER DONLE, OF MERIDEN, CONNECTICUT, ASSIGNOR TO THE CONNECTICUT TELEPHONE & ELECTRIC COMPANY, INCORPORATED, OF MERIDEN, CONNECTICUT, A CORPORATION OF CONNECTICUT.

CONDENSER.

Application filed September 22, 1923. Serial No. 664,158.

The object of my invention is to provide a convenient, cheap and efficient variable condenser for tuning radio and other electrical circuits and for other purposes. A further object is to provide, in a single condenser of small size, a wide range of values of electrostatic capacity, and thus to produce a single "universal" instrument that may be used in place of any of several sizes of ordinary variable condenser.

Variable electrical condensers fall into two general classes, (1) those in which the effective area of the opposing plates or armatures is varied and (2) those in which the separation of the plates is altered by adjustment. The first class includes the ordinary segmental or Korda type, which is bulky and mechanically complicated and frequently inefficient. The second class includes the condenser described and claimed in my U. S. Patent #1,240,958. My present invention is an improvement upon the prior condensers in this second general class, and utilizes a simple and effective means of varying the separation of, or dielectric space between condenser plates for adjusting their joint electrostatic capacity by infinitesimal increments.

In the condenser of my prior patent above cited the capacity is varied by moving together or apart a pair of substantially parallel plane plates, a compound dielectric being used. In my present condenser I prefer to retain the compound dielectric, but I make one of the plates in curved or bent form and press or move its more distant portions toward a substantially plane plate by means of a screw, as illustrated, a cam or otherwise. Further, for ease of assembly and manufacture, I prefer to provide two such curved plates bent in opposite directions and placed with their concave faces toward each other. In this construction I place between the two bent plates a pair of thin dielectric sheets (of mica, for example) so that on pressing the two bent plates together they approach more and more closely the dielectric planes. Between the two dielectric sheets I place the oppositely poled plate of the condenser, using, for example, a sheet of copper foil or tin foil. This central sheet may be divided and each portion used as an armature of a compound condenser, the bent plates constituting a common intermediate armature.

My novel construction can perhaps best be understood by reference to the accompanying drawings in which.

Figure 3:
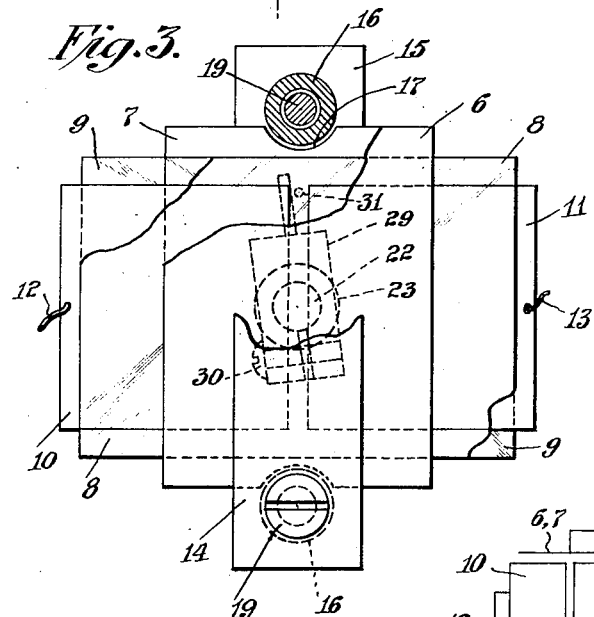
Fig. 3 is a section on the line 3—3 of Fig. 2 showing on a larger scale the armature and dielectric elements of the condenser and their supporting means, certain parts being broken away.
Figure 4:
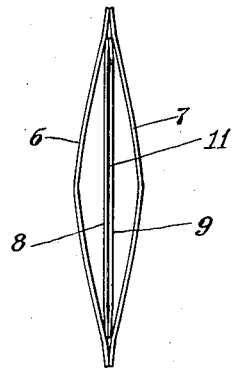
Fig. 4 is an edge view taken at right angles to Fig. 3 greatly exaggerating the bow of the outer plates.

Referring now to Figs. 3 and 4 showing the condenser proper, one armature is composed of the approximately rectangular resilient plates 6 and 7 of suitable sheet material such as phosphor bronze which normally assume the position shown in Fig. 4 with their concave faces turned towards each other and their shorter opposite edges in electrical contact. Between the plates 6 and 7 I place two thin sheets 8 and 9 of dielectric material such as mica, also of approximately rectangular configuration but with their longer edges adjacent the shorter edges of the plates 6 and 7. For the second armature or plate of the condenser I find most desirable a thin metal foil such as tin or copper which I secure to the inner faces of the dielectric sheets 8 and 9 by a suitable low electrical loss adhesive. When a condenser of ordinary capacity range is desired, I may use a single sheet of the foil, somewhat narrower than the mica sheets which insulate it from the outside plates, but in order to obtain a greater range of possible capacities I may divide the foil centrally into two sheets 10 and 11, each of which overlaps one end of the mica sheets for convenience in attaching conductors 12 and 13.

I mount the capacity elements on a metal strip 14 which is separated from a similar strip 15 by two spacing sleeves 16. The shorter ends of condenser plates 6 and 7 are notched as at 17 to fit loosely between the sleeves 16 which keep the plates from sliding on the strip 14. The parts thus far described may be mounted as a unit on a face plate 18 by means of screws 19 which extend through the strip 14, sleeves 16 and strip 15 into two interiorly threaded bushings 20 which may be secured on the inner surface of the face plate as by screws 21. Obviously this provides a strong rigid mounting for the condenser parts.

Figure 1:
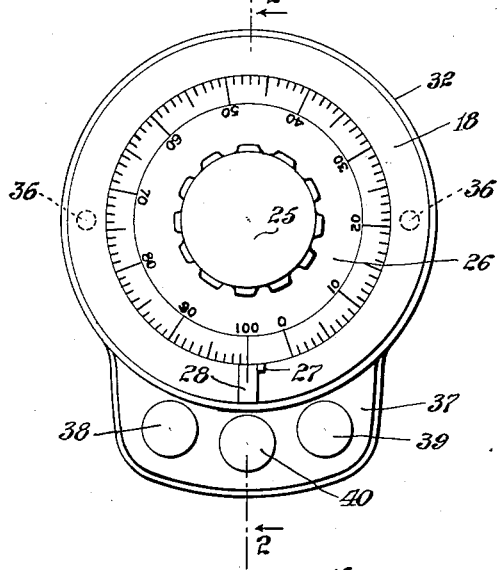
Figure 1 is a front elevation of a condenser embodying my invention.
Figure 2:
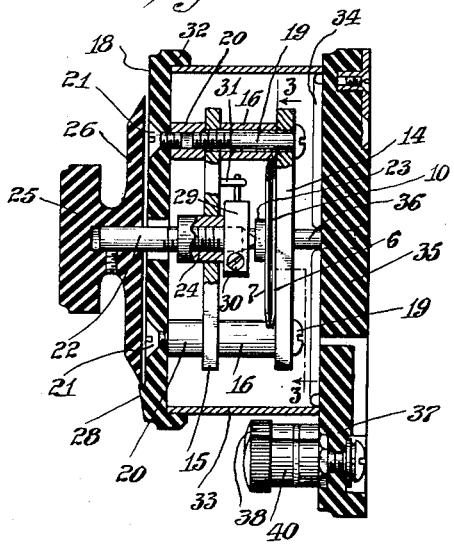
Fig. 2 is a transverse section taken on the line 2—2 of Fig. 1 showing the parts assembled in a casing.

To control the degree of flexure of the plates 6 and 7, and thus to vary continuously the capacity of the condenser, I provide a screw 22 which bears against a recess in the face of a button 23 interposed between the screw and plate 7. I mount the operating screw 22 in a threaded bushing 24 which extends through plate 15 and is rigidly secured thereto. Screw 22 is turned by any suitable knob 25 secured to its free end as by a set screw, and which may have a dial 26 with any desired graduations for example from 0 to 100 as shown in Fig. 1. A stop 27 on the dial cooperates with a lug 28 on the face plate 18 to limit rotation of the knob 25 and operating screw 22. Instead of using the stop and lug to limit the rotation of the screw 22, I may place on the screw a clamp 29 having one split end which may be tightened by a screw 30 and carrying at its other end a pin which abuts against a stop 31 affixed to strip 15, or I may use both the dial stop and the clamp. Both the stops described permit nearly one complete revolution of the operating screw between the extreme compressed position of the spring condenser plates and the position of their greatest flexure.

I obtain a desirable capacity characteristic with respect to the angular position of the dial by properly curving my armature plates 6 and 7. If these plates were curved uniformly when bowed or flexed, the rate of increase of capacity between them and the foil would for some purposes be much too rapid as they approached their fully compressed or flattened position. I may therefore avoid this characteristic by giving each half of each plate a very slight curvature and giving to the central junction portion a much sharper curvature when in the flexed position shown in Fig. 4. The rate of capacity increase with rotation of the dial will then closely approximate the frequently desired parabolic or "square-law" relation which in a simple resonant circuit gives equal linear increase of tuned wavelength with equal angles of rotation. The mica sheets and foil are so thin that such curvature of the resilient plates permits good contact between their end edges even when they are fully compressed. The metal armature plates when connected to ground also act as a shield for the condenser thus obviating hand capacity and other disadvantageous effects experienced with unshielded condensers.

The face plate 18 with its attached condenser parts may be mounted in any desired manner, but preferably I provide a dust proof casing by fitting within the marginal flange 32 of the face plate a suitable cylinder 33, the other end of which fits over a ring 34 on the face of an insulating base 35. The casing may be held together by a number of screws 36 extending through the base near its edge into holding means such as threaded eyelets molded in the inner side of the face plate. For convenience in making connections to the condenser, I preferably use a base having a lateral extension 37 on which I mount terminals such as binding posts.

When a single sheet of foil constitutes one armature of the condenser and one or two resilient plates constitute the other armature, only two binding posts will be necessary, and these I locate near opposite ends of extension 37 as at 38 and 39. I connect the sheet of foil to one binding post by a conductor which extends through a hole in the base and through a slot countersunk in the bottom of the base to a binding screw countersunk in the base and connected to the binding post. Similarly I connect the flexible plates to the other binding post, one of the screws 19 acting as a convenient means for retaining the end of the wire which is connected through the strip 14 to plate 6. With this construction I obtain at least as great a range of capacity as is usual with the ordinary multiple plate type of condenser in which the effective area of the plates is varied, and by using armatures of the correct size I may obtain any desired capacity.

Figure 5:
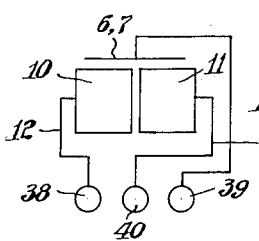
Fig. 5 is a diagram showing one way of connecting the condenser plates to a set of terminals.

In the preferred form of my invention however, I obtain a very much greater range between maximum and minimum capacity. I attain this result by subdividing the inner armature into the two approximately equal parts 10 and 11 and connecting them respectively to binding posts 38 and 40, while the flexible plates 6 and 7 are connected to post 39, all as illustrated in Fig. 5. To obtain the largest capacity I connect one conductor to both posts 38 and 40 and the other conductor to post 39 thus placing armatures 10 and 11 in parallel. One model connected in this manner showed a capacity range between 0.00082 m. f. with the dial set at 100 and 0.00013 m. f. with the dial set at 0. To decrease the capacity of the condenser, one line conductor may be connected to either post 38 or 40 and the other to post 39. This circuit uses only one of the armatures 10 or 11, and a test showed a range between 0.00046 m. f. and 0.000072 m. f. To still further decrease the capacity, I connect one line wire to post 38 and the other to post 40, at which time the armatures 10 and 11 are in series while plates 6 and 7 act as the oppositely poled plates. A test with this connection showed 0.00022 m. f. maximum and 0.000035 m. f. minimum. Thus by merely connecting to the proper binding posts I am able to obtain from a single instrument a range of capacity which would require three of the ordinary multiplate condensers, for example an 11 plate, a 21 plate and a 43 plate structure.

While I have described a preferred embodiment of my invention, it is to be understood that certain parts may be substituted for other parts or omitted entirely without in any manner departing from the scope of the invention as defined by the appended claims. For example, I do not wish to be limited to any particular number of armatures or plates as the number and arrangement of these may be varied so as to use only a single pair of plates or to operate simultaneously a large number. The mounting of the condenser which I have described is particularly suitable for table or portable use, and it is understood that the casing and face plate may be omitted and the condenser assembly proper secured directly to a panel. Other changes in arrangement will occur to those skilled in the art.

I claim:

1. A condenser comprising two spaced plates in a common plane, separate circuit terminals for said plates, a third plate movable toward and from said spaced plates, a third circuit terminal connected to said third plate, and a layer of dielectric material between said third plate and said two spaced plates and means for pressing said elements together to vary the air space between them.

2. A condenser comprising two bars, connecting members between said bars, a bendable condenser plate notched on opposite ends to provide guides on said connecting members and adjusting means for bending said plate.

3. A condenser comprising two bars, spacing sleeves between said bars, securing screws passing through said sleeves, a plurality of plates mounted between said bars, at least one of said plates being movable toward and from another plate, an adjusting screw passing through one of said bars for pressing said plates together and an indicating dial secured to said adjusting screw.

4. A condenser comprising a base member, three circuit terminals mounted thereon, a face plate, a frame secured to said face plate, relatively stationary and movable plates mounted in said frame and connected to said circuit terminals, an adjusting screw passing through said face plate and said frame to connect with the movable plate, a knob and dial secured to said screw and an insulating wall surrounding said frame between said face plate and said base member.

HAROLD POTTER DONLE.